(12) United States Patent
Sivakumar et al.

(10) Patent No.: US 11,178,527 B1
(45) Date of Patent: Nov. 16, 2021

(54) METHOD AND APPARATUS FOR PROACTIVE DATA HINTING THROUGH DEDICATED TRAFFIC CHANNEL OF TELECOM NETWORK

(71) Applicant: International Business Machines Corporation, Armonk, NY (US)

(72) Inventors: Gandhi Sivakumar, Bentleigh (AU); Lynn Kwok, Bundoora (AU); Sarvesh S. Patel, Pune (IN); Kushal S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/872,562

(22) Filed: May 12, 2020

(51) Int. Cl.
*H04W 4/50* (2018.01)
*H04L 29/08* (2006.01)
*H04L 12/04* (2006.01)
*G06F 9/50* (2006.01)
*G06F 9/455* (2018.01)
*H04L 12/24* (2006.01)

(52) U.S. Cl.
CPC .......... *H04W 4/50* (2018.02); *G06F 9/45558* (2013.01); *G06F 9/5072* (2013.01); *G06F 9/5077* (2013.01); *H04L 41/5096* (2013.01); *H04L 67/32* (2013.01)

(58) Field of Classification Search
CPC ...... H04W 4/50; H04L 41/5096; H04L 67/32; G06F 9/45558; G06F 9/5072; G06F 9/5077
USPC ...................................................... 455/414.1
See application file for complete search history.

(56) References Cited

U.S. PATENT DOCUMENTS

| | | | |
|---|---|---|---|
| 9,009,660 B1* | 4/2015 | Griffin | G06F 8/445 717/119 |
| 2010/0235285 A1* | 9/2010 | Hoffberg | G06Q 20/401 705/75 |
| 2010/0293283 A1* | 11/2010 | Andrade | G06F 9/547 709/230 |
| 2017/0374151 A1* | 12/2017 | Moorthi | H04L 67/2847 |
| 2018/0041994 A1 | 2/2018 | Zhang | |

(Continued)

FOREIGN PATENT DOCUMENTS

WO    WO2019162430 A1    8/2019

OTHER PUBLICATIONS

Sean Bryson, Cisco, 5G technology needs edge computing architecture, undated, retrieved from internet May 12, 2020 https://www.cisco.com/c/en/us/solutions/enterprise-networks/edge-computing-architecture-5g.html.

(Continued)

*Primary Examiner* — Inder P Mehra
(74) *Attorney, Agent, or Firm* — Terrile, Cannatti & Chambers, LLP; Emmanuel A. Rivera

(57) ABSTRACT

A method, system and computer-usable medium are disclosed for proactive data hinting in a telecom network. In certain embodiments, the invention relates to receiving a data hinting request for an application at a virtual network framework of the telecom network. A dedicated hinting channel is selected to provide the proactive data hinting; monitoring for the hinting request. Data is moved from the resource, such as edge cloud computing, where the application is implemented when the proactive data hinting is received. The application is used by user equipment, access points and Internet of Things (IoT) devices.

20 Claims, 6 Drawing Sheets

(56) References Cited

U.S. PATENT DOCUMENTS

| | | |
|---|---|---|
| 2018/0102985 A1 | 4/2018 | Byers et al. |
| 2018/0247076 A1* | 8/2018 | Lerner ................ G06F 21/6263 |
| 2018/0248970 A1* | 8/2018 | Lepeska ............. G06F 16/9574 |
| 2018/0359802 A1 | 12/2018 | Cho et al. |
| 2019/0364330 A1* | 11/2019 | Moroney ........... H04N 21/6143 |
| 2020/0128067 A1* | 4/2020 | Guim Bernat ........ G06F 9/4881 |
| 2020/0275360 A1* | 8/2020 | Bordeleau ............. H04W 76/11 |

OTHER PUBLICATIONS

FCC Technological Advisory Council, 5G IoT Working Group, 5G Edge Computing Whitepaper, undated, retrieved from internet May 12, 2020 https://transition.fcc.gov/bureaus/oet/tac/tacdocs/reports/2018/5G-Edge-Computing-Whitepaper-v6-Final.pdf.

internetofbusiness.com, IoT: Understanding the shift from cloud to edge computing, undated, retrieved from internet May 12, 2020 https://internetofbusiness.com/shift-from-cloud-to-edge-computing.

Wayne Rash, PC News, IT Needs to Start Thinking About 5G and Edge Cloud Computing, Feb. 7, 2018 https://in.pcmag.com/feature/119014/it-needs-to-start-thinking-about-5g-and-edge-cloud-computing.

westerndigital.com, Why Edge Computing is Key to a 5G Future, Jul. 26, 2018 https://datamakespossible.westerndigital.com/edge-computing-key-5g-future.

* cited by examiner

METHOD AND APPARATUS FOR PROACTIVE DATA HINTING THROUGH DEDICATED TRAFFIC CHANNEL OF TELECOM NETWORK

BACKGROUND OF THE INVENTION

Field of the Invention

The present invention relates in general to the field of computers and similar technologies, and in particular to software utilized in this field. Still more particularly, the present invention relates to a method, system, and computer-usable medium for proactive data hinting in a telecom network.

Description of the Related Art

The telecommunication industry continues to evolve and grow, providing for the development technologies that increase bandwidth communication, the ability to perform remote computing, implementing artificial intelligence (AI), etc. For example, 5G technology provides for greater mobility bandwidth from previous standards, and allows for the convergence of different devices, such as internet of things (IoT) devices.

In a 5G implemented device (i.e., user equipment or UE device), a medium access control (MAC) provides services to a radio link control (RLC) layer, where controls are provided in the form of logical channels. These logical channels are a virtualized communication network interface that transfer input/output (IO) commands through network data packets, as well as control instructions, over a radio interface and 5G fixed access network. A logical channel is defined by the type of information that is carried. In general, a logical channel is differentiated as a control channel and used for transmission of control and configuration information or used as a traffic channel for user data. 5G allows for multiple logical channels to be created over a single radio bearer network using 5G network models.

SUMMARY OF THE INVENTION

A method, system and computer-usable medium are disclosed for proactive data hinting in a telecom network. In certain embodiments, the invention relates to proactive data hinting in a telecom network comprising: receiving a data hinting request for an application; selecting a dedicated hinting channel to provide the proactive data hinting; monitoring for the hinting request; and moving data to a resource where the application is implemented when the proactive data hinting is received.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

A system, method, and computer-readable medium are disclosed for proactive data hinting in a telecom network. A client or user equipment (UE) device communicates to a virtual network framework of a telecom device, providing proactive data hinting. The proactive data hinting initiates migration of data to applications that are run on edge computing resources, such as cloud based computing, that provides low latency application data to the client or UE device and other access points that include Internet of Things (IoT) devices.

Figure 1:
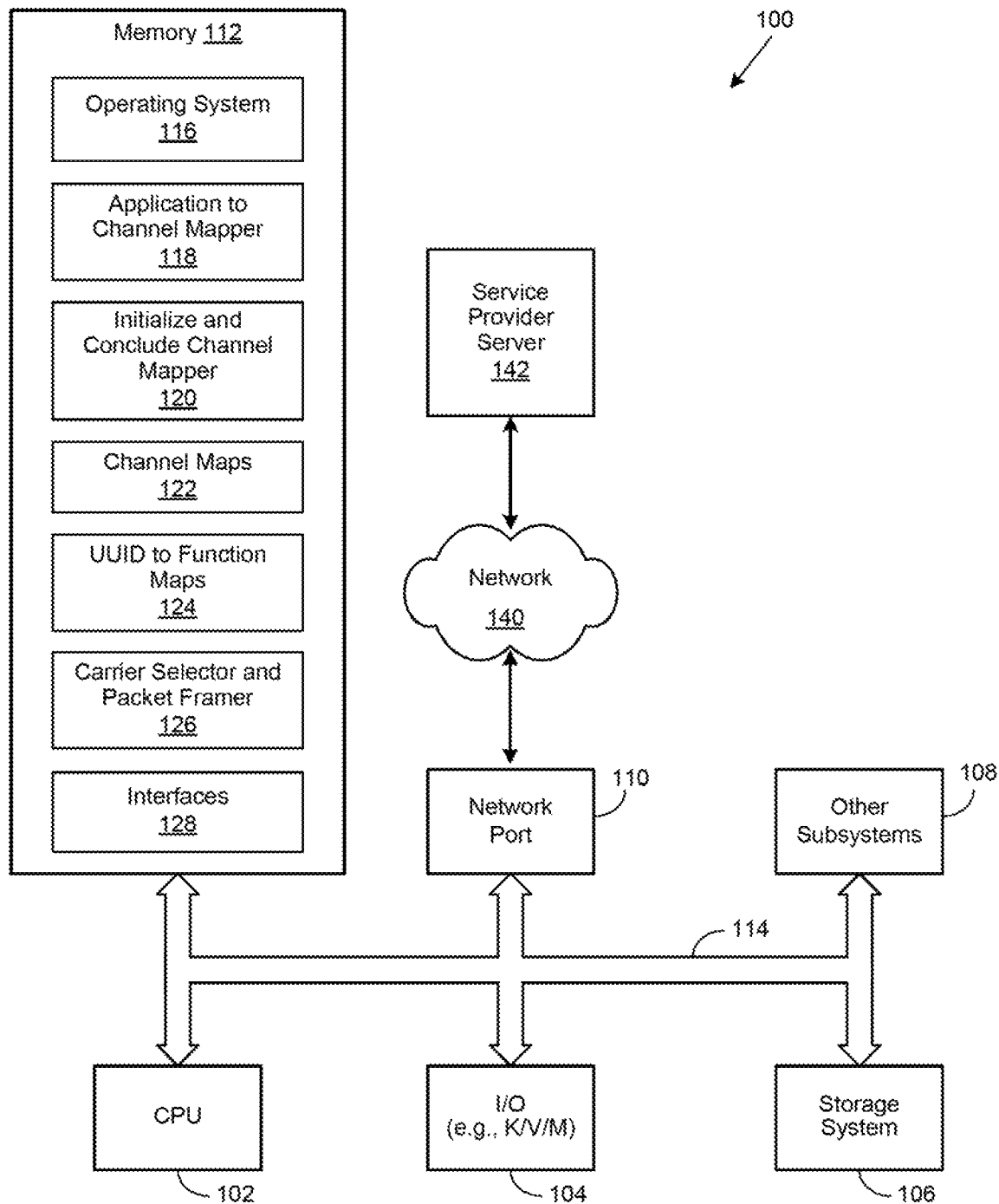
FIG. 1 depicts an example information handling system that can be used to implement the system and method of the present invention.

FIG. 1 is a generalized illustration of an information handling system 100 that can be used to implement the system and method of the present invention. The information handling system 100 includes a processor (e.g., central processor unit or "CPU") 102, input/output (IO) devices 104, such as a display, a keyboard, a mouse, and associated controllers, a storage system 106, and various other subsystems 108. In certain implementations, the processor 102 includes a dedicated traffic channel or DTCH controller.

In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116. In various embodiments, the system memory 112 includes an application to channel mapper 118, an initialize and conclude channel mapper 120, channel maps 122, a universal unique identifier (UUID) to function maps 124, a carrier selector and packet framer 126, and interfaces (e.g., application program interfaces) 128, which in general are support communication to a telecom network through dedicated traffic channels (DTCH), as further described herein. In particular, the DTCHs are implemented to provide proactive data hinting to the telecom network.

Figure 2:
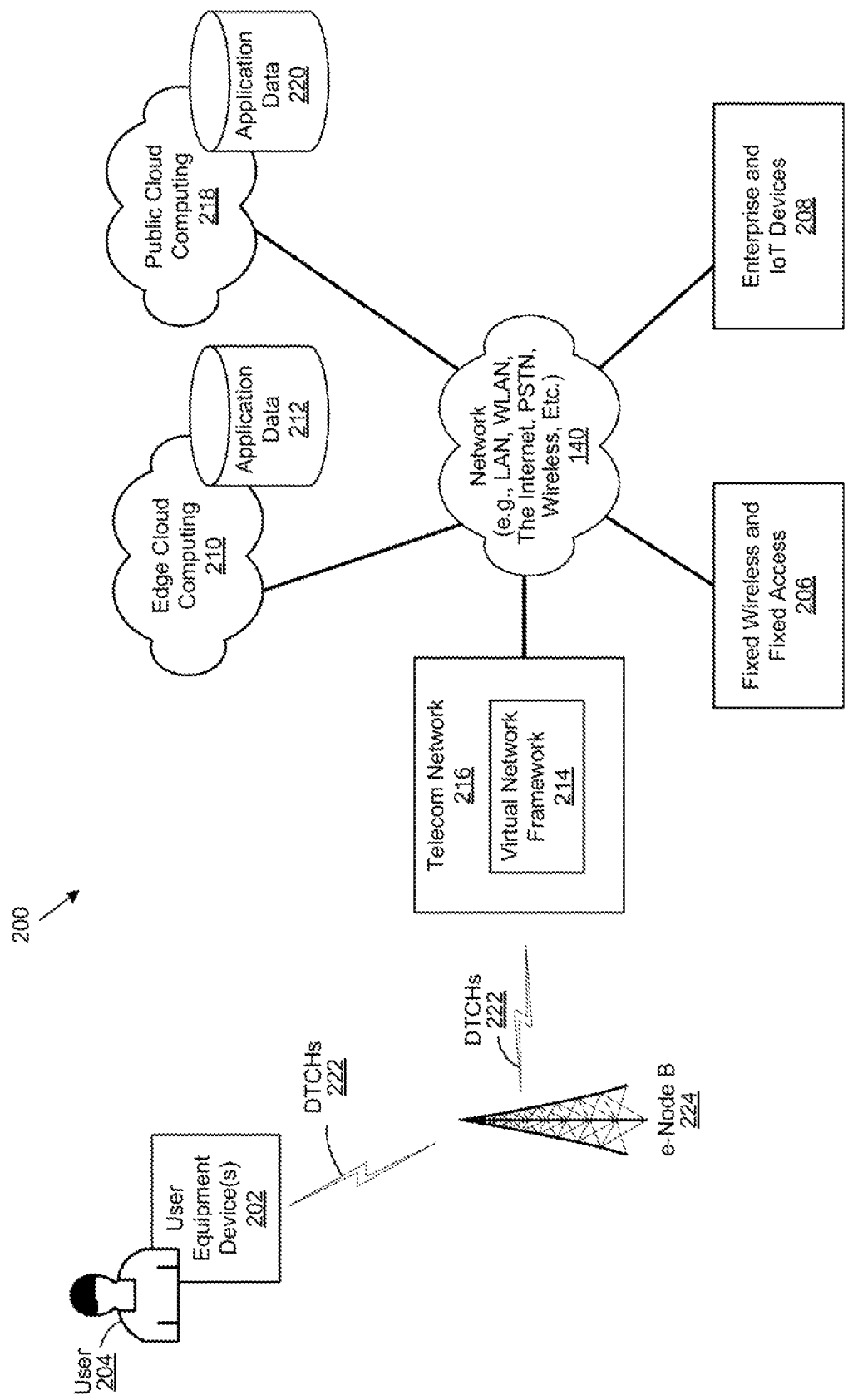
FIG. 2 depicts an example of a system of proactive data hinting to a telecom network.

FIG. 2 is a simplified block diagram of a system of proactive data hinting to a telecom network. The system 200 includes one or more user equipment (UE) devices 202 as employed by users 204. The system 200 further can include fixed wireless and fixed access points 206 and enterprise and Internet of Things (IoT) devices 208. UE devices 202, fixed wireless and fixed access points 206, and enterprise and Internet of Things (IoT) devices 208 can be considered as endpoints.

In various embodiments, applications and data are provided to endpoints by edge computing 210 and application data 212. Increased computing and process efficiency can be realized by UE devices 202, fixed wireless and fixed access points 206 and enterprise and Internet of Things (IoT) devices 208, collectively considered as endpoints, by implementation of low latency applications and actionable data provided at edge computing 210 and by application data 212. In certain embodiments, edge computing 210 is implemented as part of a 5G edged cloud virtual network framework (VNF) 214 of a telecom network 216. The VNF 214 is further described herein.

Edge computing as part of 5G technology allows applications, or their 5G service orchestration instances, to run to relatively close to UE devices 202, fixed wireless and fixed access points 206 and enterprise and Internet of Things (IoT) devices 208. This can greatly benefit cognitive applications performance and associated Quality of Experience (QoE) and improve efficiency. Furthermore, when resources such as data, compute and storage are allocated at the edged location, they can be accessed easily with lower input output (I/O) latency from the UE devices 202. However, consideration is made that application minimal elements are kept at the edge computing 210, since there is resource and economic cost In certain embodiments, a public cloud computing 218 provides offline data core applications, artificial intelligence (AI) training, content applications, and other applications. Public cloud computing 218 accesses application data 220 which can include highly used sensitive data. In certain implementations, data is pulled from application data 220 to edge computing 210 and application data 212. For example, data that is accessed frequently from application data 220 is moved to edge computing 210 and application data 212, since there is lower computing/processing latency from edge computing 210 than public cloud computing 218, to the endpoints. As described herein, a data hinting request with a hinting requirement for a specific application at edge computing 210 is received by the VNF 214.

In certain implementations, the UE devices 202 employ multiple dedicated traffic channels (DTCH) 222. DTCHs 222 are logical channels to a service management platform (not shown) of telecom network 216. Applications on UE devices 202 access data (i.e., application data 212) via allocated DTCHs 222. Multiple dissimilar operations can be performed by the applications on UE devices 202 which share the allocated DTCHs 222. Referring back to FIG. 1, the application to channel mapper 120 and the UUID to function maps 124 may be implemented for such applications, where functions can be designated to particular DTCHs 222. For example:

Application1:
function X=>DTCH_1
function Y=>DTCH_2
function Z=>DTCH_HINTING_<XX>
Application2:
function XX=>DTCH_1034
function YY=>DTCH_HINTING_<XX>
function ZZ=>DTCH_123

When an application starts accessing the data, a virtual network function at an infrastructure management plane as further described herein, of telecom network 216 detects that data is getting frequently accessed and detects the location of the data (i.e., at edge computing 210 or public cloud computing 218). A data access map (i.e. channel maps 112 of FIG. 1) can be generated based on the number of VO operations performed on the data irrespective of the reason of accessing the data. Therefore, if data is detected at public cloud computing 218 or application data 220, the data can be moved or pulled to edge computing 210 or application data 212. In certain implementations, this is accomplished using an access counter and policies.

As further described herein, the DTCHs 222 include data hinting/traffic channels which can be referred to as HINTING_INIT_DTCH. In certain implementations, a dedicated hinting/traffic channel is selected from hinting/traffic channels based on the data hinting request described above. A requirement for the application which can be based on a logical channel command by control instruction framing, in the event none of data hinting/traffic channels are detected operational.

Certain implementations provide for monitoring the incoming data request for the application on the logical DTCH channel on a regular basis. The application data from cloud computing 218 or application data 220 is moved/migrated to edge computing 210 and VNF 214.

Certain implementations provide for an ordered list of "n" elements or a tuple of network details (e.g., universally unique identifier (UUID) of the logical DTCH channel, bandwidth, connection status, etc. of the moved/migrated application data to edge computing 210 and VNF 214 for processing the data and control data, and moving/migrating the application from to edge computing 210 and VNF 214 to cloud computing 218 or application data 220 based on infrequent use of the application data.

Various embodiments provide for UE devices 202 to connect to an e-Node B (evolved node) 224 through DTCHs 222, which are further forwarded/connected to the telecom network 216.

In certain embodiments, the network 140 connects telecom network 216 with fixed wireless and fixed access points 206 and enterprise and Internet of Things (IoT) devices 208, edge cloud computing 210, and public cloud computing 218. The network 140 may be a public network, such as the Internet, a physical private network, a wireless (e.g., cellular) network (e.g., 5G network including telecom network 216), a virtual private network (VPN), PSTN (public switched telephone network), computer network, or any combination thereof. Skilled practitioners of the art will recognize that many such embodiments are possible, and the foregoing is not intended to limit the spirit, scope or intent of the invention.

Figure 3:
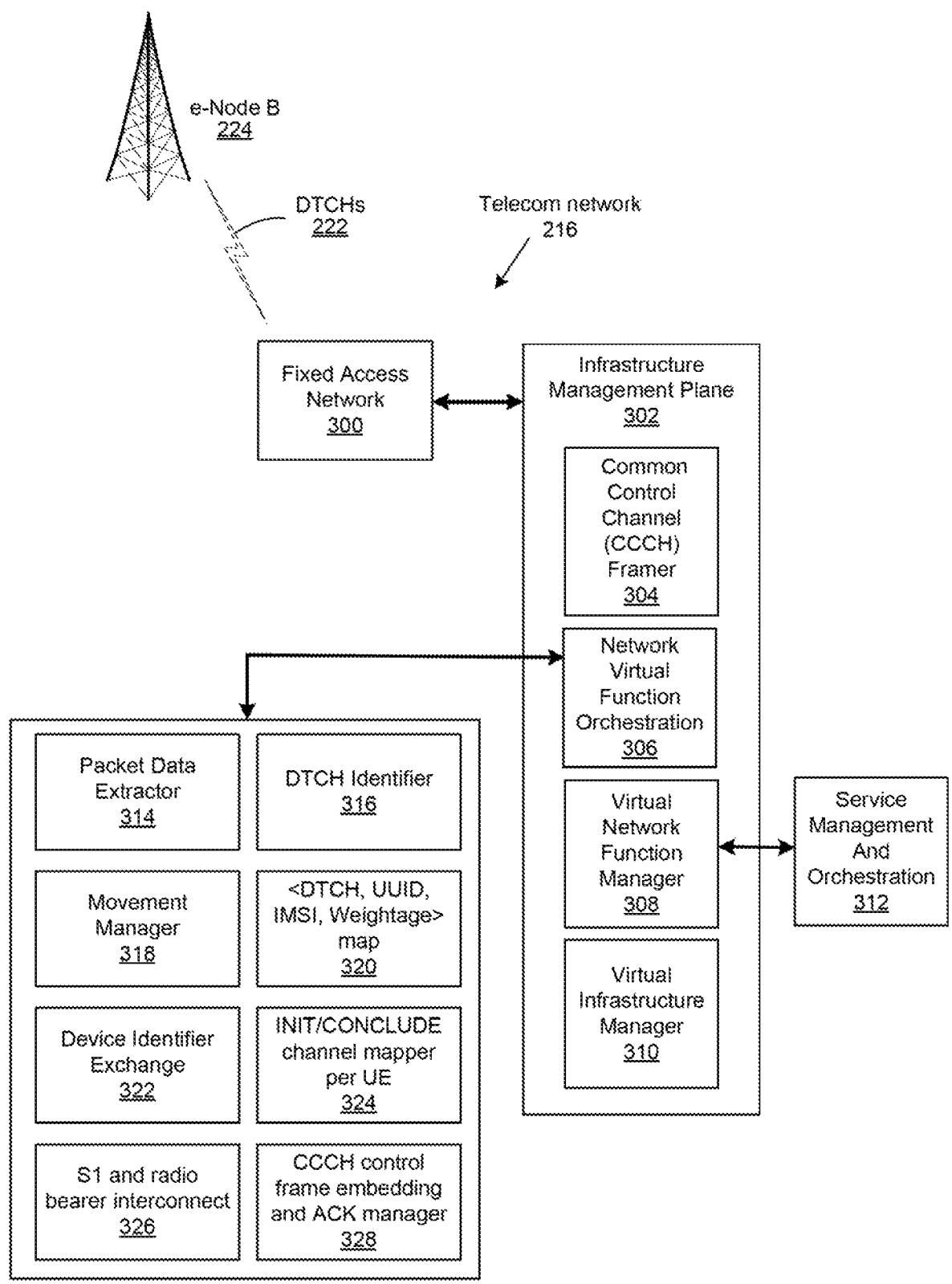
FIG. 3 depicts an example architecture in a telecom network that supports the described proactive data hinting.

FIG. 3 shows an architecture in a telecom network that supports the described proactive data hinting. As described above, the telecom network 216 communicates through DTCHs 222 to e-Node B 224. Certain implementations provide for the telecom network 216 to include a fixed access network 300 that connects with e-Node B 224. The fixed access network 300 communicates with an infrastructure management plane 302. In certain implementations, the infrastructure management plane 302 includes a common control channel (CCCH) framer 304, a network virtual function orchestration component 306, a virtual network function manager 308, and a virtual infrastructure manager 310. The virtual network function manager 308 can be considered as part of a service management and orchestration layer 312, as further described in FIG. 4.

In certain implementations, the telecom network 216 includes components that communicate with the network virtual function component 308. Such components can include a packet data extractor 314; a DTCH identifier 316; a movement manager 318; a map 320 that includes DTCH, UUID, IMSI (International mobile subscriber identity), and weightage information; a device identifier exchange 322; an initialize/conclude channel mapper per UE 324, and SI and radio bearer interconnect 326, and a CCCH control frame embedding and acknowledge manager 328.

Figure 4:
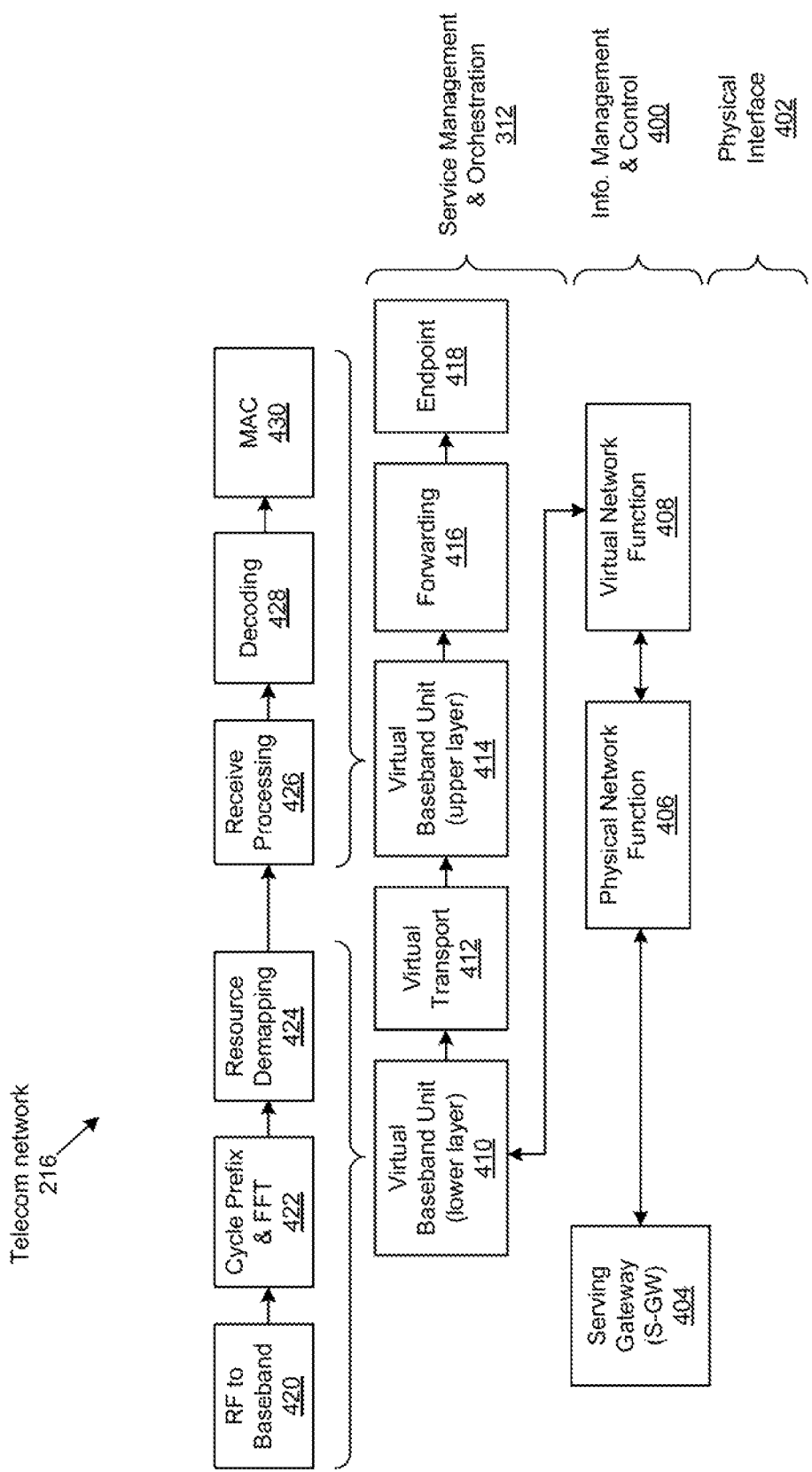
FIG. 4 is an example of a block diagram for dedicated traffic channel (DTCH) pull and packet transmission.

FIG. 4 is a block diagram for DTCH pull and packet transmission. Data packets are communicated between UE devices 202 and the telecom network 216. As described, DTCHs 222 provide paths between the UE devices 202 and the telecom network 216, to particularly provide for proactive data hinting.

The telecom network 216 includes interface layers, and particularly the service management and orchestration layer 312 as described above, information management and control layer 400, and physical interface layer 402.

In certain implementations, a service gateway 404 receives and sends data packets from the c-Node B 224 as described above. A physical network function component 406 communicates with a virtual network function component 408. Operations as described herein are performed at the virtual network component 408. The physical network function component 406 communicates and virtual network function component 408 are part of the information management and control layer 400.

In an embodiment, the service management and orchestration layer 312 includes a virtual baseband unit (lower layer) component 410, a virtual transport component 412, a virtual baseband unit (upper layer) component 414, and a forwarding component 416. As shown in FIG. 4, data packets are communicated by the respective components, where the virtual baseband unit (lower layer) component 410 receives data packets from the virtual network component 408. The forwarding component 416 sends data packets to an endpoint 418, such as UE devices 202. Collectively, the virtual baseband unit (lower layer) component 410, the virtual transport component 412, and the virtual baseband unit (upper layer) component 414 provide operational network services. Along with forwarding component 416, end user services are provided.

In certain implementations, the virtual baseband unit (lower layer) component 410 includes RF to baseband layer 420, a cycle prefix and Fast Fourier Transform (FFT) layer 422 and resource demapping layer 424. In certain implementations, the virtual baseband unit (upper layer) component 414 includes receive processing layer 426, decoding layer 428 and media access control (MAC) layer 430.

Figure 5:
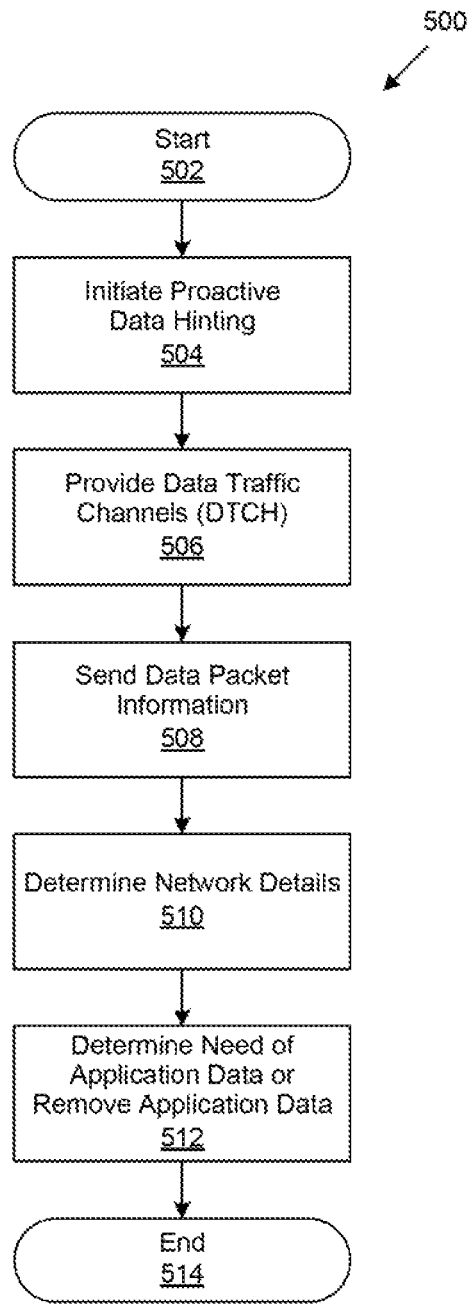
FIG. 5 is a generalized flowchart of communicating proactive data hinting and supporting edge computing.

FIG. 5 is a generalized flowchart 500 for communicating proactive data hinting and supporting edge computing. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 502, the process 500 starts. At step 504, proactive data hinting is initiated. Components as described in FIG. 1 resident on clients or UE devices 202 are implemented, as well as components as described regarding virtual network framework 214 in FIG. 2, and the components regarding virtual framework of FIGS. 3 and 4 in processing data and control protocol data units (PDU) through telecom network 216. After initiating a client or UE device 202, data structures (of PDUs) used for communications are loaded at the source and VNF locations the include hinting maps, accessibility methods, and user equipment (UE), dedicated traffic channels (DTCH). and common control channel CCCH mappings. After initiating the client or UE device 202 and VNF functions, the client or UE device 202 polls for hinting requirements for applications at edge computing 210.

At step 506, dedicated traffic channels (DTCH) are provided. When the hinting requirements for applications are received/polled. A map for existing or new dedicated DTCH is traversed, where the map is provided through application channel mapper 118 and channel maps 122. The map can provide a tuple of DTCH UUID, bandwidth and connection status. If there is no existing or operational dedicated DTCH, the instance of the client or UE device 202 initiates creating of a logical channel command by control instruction framing to the telecom network 216 (virtual network framework 214), which can be implemented through the carrier selector and packet framer 126. Once weightage factors are negotiated between client or UE device 202 and the telecom network 216, bandwidth, Quality of Service Class Identifier (QCI), and guaranteed bit rate (GBR) values are exchanged. A new dedicated logical channel (DTCH) is created over a physical radio bearer, and a UUID is allocated to the new DTCH. The client or UE device 202 can map the UUID to a local hinting database or storage system 106 with "INIT" as a channel and instruct the virtual network framework 214 to use the channel as hinting using in-bound instructions. Once the dedicated DTCH is available, the virtual network framework can poll on a regular basis for incoming data on the dedicated DTCH.

At step 508, data packet information is sent. When an application at the edge computing 210 needs data to be moved from public cloud computing 218, the application sends a control command which can be in the form of a platform message signal to a packet carrier engine at the client or UE device 202. The packet carrier engine decodes the message and formulates and U/O packet for the respective data to be received. When the data packet information is formed, the dedicated DTCH is selected as a carrier in the data packet header. The data packet information can be sent over via radio with a tag of "HINTING_INIT_DTCH."

At step 510, network details are determined. When the data packet information is received by the virtual network framework 214, data packet header is decoded to determine network details. The DTCH UUID is fetched and VNF channel mapping datastore is traversed. If "HINTING_INIT_DTCH" is detected as a carrier, the selected data can be sent for further processing. Once data is sent for processing, the virtual network framework 214 triggers current physical location identification services to locate the data. VNF data movement instruction to the physical location physical network function (PNF) is performed. Data movement activity is performed, and data is moved to edge cloud computing 210. The client or UE device 202 is acknowledged for "HINTING_INIT_DTCH" activity and data movement to the near location (edge cloud computing 210).

At step 512, determining is performed as to need for the application data or removal of the application data form edge cloud computing 210. In an implementation, a carrier is selected as "HINTING_CONCLUDE_DTCH" and the data packets are sent over. The steps above can be followed to create a map as to "HINTING_CONCLUDE_DTCH." Data can then be moved to core cloud computing 218, and the client or UE device is acknowledged. At step 514, the process 500 ends.

Figure 6:
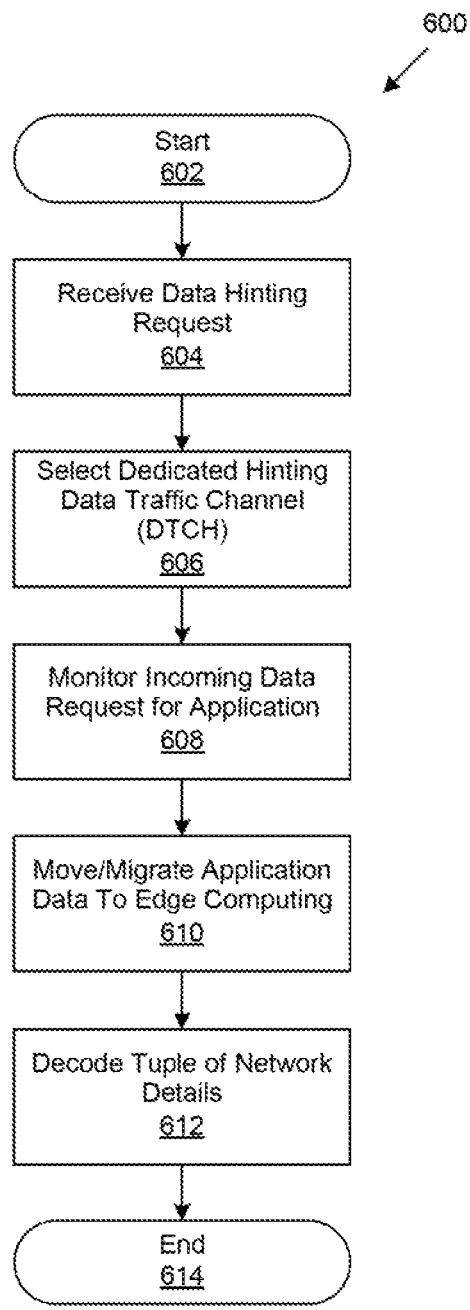
FIG. 6 is a generalized flowchart of proactive data hinting in a telecom network.

FIG. 6 is a generalized flowchart 600 for proactive data hinting in a telecom network. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 602, the process 600 starts. At step 604, a data hinting request is received with a hinting requirement for an application. As described, a client or UE devices 202 communicate with a virtual network framework 214 of telecom network. The application runs on edge cloud computing 210, which can reduce latency to the UE devices and other access point and devices, such as Internet of Things (IoT).

At step 606, a dedicated hinting/traffic channel is selected. The hinting/traffic or data traffic channel (DTCH) can be selected from a plurality of existing dedicated hinting channels. The selected DTCH is based on the received hinting request, and requirement for the application. The DTCH can be provided by creating a logical channel command via a control instruction framing, in the event a DTCH is not available or operational.

At step 608, monitoring is performed for the incoming data hinting request for the application. The monitoring is performed on the dedicated DTCH and can be on a regular basis.

At step 610, data is moved to where the application is implemented.

Implementations of the application are on the edge cloud computing 210. In certain implementations, the data is provided from another cloud computing resource, such as public cloud computing 218.

At step 612, decoding of a tuple of network details is performed. The tuple can include network details (e.g., universally unique identifier (UUID) of the logical DTCH channel, bandwidth, connection status, etc. of the moved/ migrated application data to edge computing 210 and VNF 214 for processing the data and control data, and moving/ migrating the application from to edge computing 210 and VNF 214 to cloud computing 216 or application data 218 based on infrequent use of the application data. At step 614, the process 600 ends.

For the purposes of this disclosure, a computing device or an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (V/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for proactive data hinting in a telecom network comprising:
   receiving a data hinting request for an application when the application accesses data;
   generating a data access map when the application accesses the data;
   selecting a dedicated hinting channel based on the data hinting request, to provide the proactive data hinting;
   monitoring for the hinting request; and
   moving data to a resource where the application is implemented when the proactive data hinting is received, wherein the dedicated hinting channel is selected as a carrier.

2. The computer implemented method of claim 1, wherein the telecom network is a 5G network.

3. The computer implemented method of claim 1, wherein the selecting is from a plurality of available data traffic channels.

4. The computer implemented method of claim 1, wherein the selecting comprises creating a dedicated traffic channel if the dedicated channel is not available.

5. The computer implemented method of claim 1, wherein the application is implemented on an edge cloud computing resource.

6. The computer implemented method of claim 1, wherein the moving data is from a public cloud computing resource to an edge cloud computing resource.

7. The computer implemented method of claim 1 further comprising decoding a tuple of details regarding communication over the telecom network.

8. A system comprising:
   a processor;
   a data bus coupled to the processor; and
   a computer-usable medium embodying computer program code, the computer-usable medium being coupled to the data bus, the computer program code used for in a telecom network comprising instructions executable by the processor and configured for:
      receiving a data hinting request for an application when the application accesses data;
      generating a data access map when the application accesses the data;
      selecting a dedicated hinting channel based on the data hinting request, to provide the proactive data hinting;
      monitoring for the hinting request; and
      moving data to a resource where the application is implemented when the proactive data hinting is received, wherein the dedicated hinting channel is selected as a carrier.

9. The system of claim 8, wherein the telecom network is a 5G network.

10. The system of claim 8, wherein the selecting is from a plurality of available data traffic channels.

11. The system of claim 8, wherein the selecting comprises creating a dedicated traffic channel if the dedicated channel is not available.

12. The system of claim 8, wherein the application is implemented on an edge cloud computing resource.

13. The system of claim 8, wherein the moving data is from a public cloud computing resource to an edge cloud computing resource.

14. The system of claim 8 further comprising decoding a tuple of details regarding communication over the telecom network.

15. A non-transitory, computer-readable storage medium embodying computer program code, the computer program code comprising computer executable instructions configured for:

receiving a data hinting request for an application when the application accesses data;

generating a data access map when the application accesses the data:

selecting a dedicated hinting channel based on the data hinting request, to provide the proactive data hinting;

monitoring for the hinting request; and moving data to a resource where the application is implemented when the proactive data hinting is received, wherein the dedicated hinting channel is selected as a carrier.

16. The non-transitory, computer-readable storage medium of claim 15, wherein the selecting is from a plurality of available data traffic channels.

17. The non-transitory, computer-readable storage medium of claim 15, wherein the selecting comprises creating a dedicated traffic channel if the dedicated channel is not available.

18. The non-transitory, computer-readable storage medium of claim 15, wherein the application is implemented on an edge cloud computing resource.

19. The non-transitory, computer-readable storage medium of claim 15, wherein the moving data is from a public cloud computing resource to an edge cloud computing resource.

20. The computer implemented method of claim 15 further comprising decoding a tuple of details regarding communication over the telecom network.

\* \* \* \* \*